(12) United States Patent
Krolski et al.

(10) Patent No.: US 11,021,139 B2
(45) Date of Patent: Jun. 1, 2021

(54) ADJUSTABLE WHEEL CHOCK SYSTEM

(71) Applicant: Motis Brands, Inc., Germantown, WI (US)

(72) Inventors: Robert Krolski, Kewaskum, WI (US); Richard Beilstein, West Bend, WI (US)

(73) Assignee: Motis Brands, Inc., Germantown, WI (US)

( * ) Notice: Subject to any disclaimer, the term of this patent is extended or adjusted under 35 U.S.C. 154(b) by 121 days.

(21) Appl. No.: 16/534,713

(22) Filed: Aug. 7, 2019

(65) Prior Publication Data
US 2021/0039610 A1    Feb. 11, 2021

(51) Int. Cl.
*B60P 7/08* (2006.01)
*B60T 3/00* (2006.01)
*B60P 3/077* (2006.01)

(52) U.S. Cl.
CPC ............ *B60T 3/00* (2013.01); *B60P 3/077* (2013.01)

(58) Field of Classification Search
CPC .. B60P 3/077; B60P 3/075; B60P 7/15; B60T 3/00; B60R 9/10
USPC ...................................................... 410/3, 30
See application file for complete search history.

(56) References Cited

U.S. PATENT DOCUMENTS

| | | | |
|---|---|---|---|
| 3,430,983 A | 3/1969 | Jones | |
| 3,861,533 A | 1/1975 | Radek | |
| 3,912,139 A | 10/1975 | Bowman | |
| 5,697,742 A | 12/1997 | House | |
| 6,010,287 A * | 1/2000 | Sommermeyer | B60P 3/077 410/104 |
| 6,059,496 A * | 5/2000 | Stevens | B60P 3/075 410/3 |
| 6,331,094 B1 | 12/2001 | Burrows | |
| 6,575,310 B2 | 6/2003 | Chamoun | |
| 6,640,979 B1 | 11/2003 | Mayfield | |
| 6,648,300 B2 | 11/2003 | Chamoun | |
| 6,935,619 B2 | 8/2005 | Chamoun | |
| 7,014,398 B1 * | 3/2006 | Hellwig | B60P 3/075 410/19 |
| 7,150,359 B1 | 12/2006 | Lyons et al. | |
| 7,156,403 B2 | 1/2007 | Abbott | |
| 7,316,530 B2 * | 1/2008 | Saldana | B60P 3/073 410/3 |
| 7,416,373 B2 | 8/2008 | Mock | |
| D605,092 S | 12/2009 | Buuren | |
| 7,641,086 B2 | 1/2010 | Green | |

(Continued)

OTHER PUBLICATIONS

"BW-CH-DX3 Motorcycle Trailer Chock Instruction Manual", accessed on May 18, 2012.

(Continued)

*Primary Examiner* — Stephen T Gordon
(74) *Attorney, Agent, or Firm* — Andrus Intellectual Property Law, LLP

(57) ABSTRACT

A wheel chock system includes a wheel chock configured to support a wheel of a vehicle and having an arm that extends from the wheel chock. The wheel chock includes a crossbar that has an outer wall, an open interior, and a tab extending from the outer wall into the open interior. The arm has an outer surface in which a notch is defined, and when the notch is aligned with the tab the arm is slidably received in the open interior and extendable therefrom.

20 Claims, 10 Drawing Sheets

(56) References Cited

U.S. PATENT DOCUMENTS

| | | |
|---|---|---|
| 8,104,588 B2 | 1/2012 | Curlee et al. |
| 8,439,612 B2 | 5/2013 | Chamoun |
| 8,690,503 B2 | 4/2014 | Chamoun |
| 9,409,508 B2 | 8/2016 | Graham |
| 2012/0257943 A1* | 10/2012 | Chamoun ................. B60P 7/15 410/122 |

OTHER PUBLICATIONS

BW-CH-DX1 Motorcycle Trailer Chock Instruction Manual, Discount Ramps website, retrieved from https://www.discountramps.com/motorcycle-chock/p/BW-CH-DX1/ on May 17, 2013.

"Baxley LA Trailer Chock", Discount Ramps website, retrieved from http://www.discountramps.com/baxley-trailer-chock.htm on May 17, 2013.

"MC-Bedrack", Discount Ramps website, retrieved from http://www.discountramps.com/motorcycle-tie-dow-rack.htm on Feb. 4, 2013.

"MC15R Zinc-Coated Removable Motorcycle Wheel Chock", Discount Ramps.com website, retrieved from http://www.discountramps.com/zinc-motorcycle-wheel-chock.htm on Mar. 30, 2013.

* cited by examiner

ADJUSTABLE WHEEL CHOCK SYSTEM

FIELD

The present disclosure relates to transporting vehicles on other vehicles, and more specifically to wheel chocks systems for securing vehicles to other vehicles during transportation.

BACKGROUND

Vehicles, such as motorcycles, dirt bikes, scooters, golf carts, and all-terrain vehicles (ATVs), are commonly transported by securing the vehicles on a truck bed of a pickup truck or a trailer. Conventional wheel chocks are commonly used to stabilize a wheel or wheels of a vehicle. A wheel chock connected to the truck bed or the trailer can receive a wheel of the vehicle and help to secure it to the truck bed or trailer. Accordingly, the conventional wheel chock prevents the vehicle from sliding or moving on the truck bed or trailer. Some conventional wheel chocks are fastened to the truck bed or trailer with drilled bolts or screws, for example as disclosed by U.S. Pat. No. 6,331,094. This can require permanent structural changes to the truck bed or trailer, for example, drilling of holes through which bolt or screw fasteners extend to secure the wheel chock to the truck bed or trailer.

Other conventional wheel chocks, for example, as disclosed in U.S. Pat. Nos. 9,409,508; 5,697,742; 3,912,139; 7,641,086; 7,416,373; and 7,156,403, have arms that extend into contact with the walls of the truck or the trailer to thereby brace the wheel chock between the walls. While adjustable, these wheel chocks can be difficult to maneuver and can frequently are limited in the range of adjustability and/or widths of truck beds or trailers which can be accommodated with such designs.

The present inventors have recognized several disadvantages of conventional wheel chock assemblies, such as the disadvantages noted above, and endeavored to design improved wheel chocks and wheel chock systems that provide a greater range of adjustment widths while also providing a device with improved compactness and maneuverability. Accordingly, through research and experimentation, the present inventors have developed the wheel chock system described hereinbelow.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

An exemplary embodiment of a wheel chock system includes a wheel chock configured to support a wheel of a vehicle. The wheel chock includes a base tube having an outer wall defining a tube perimeter and an open interior. An inner wall extends lengthwise through the base tube and dividing the open interior into a first cavity and second cavity. First and second arms are received within the respective first and second cavities. The first and second arms are slidingly movable in parallel past one another within the respective first and second cavities.

The wheel chock system may further include first and second holes through the outer wall of the base tube in alignment with the inner wall. A first fastener extends through the first hole to engage at least one of the first arm and the second arm within the base tube to secure at least one of the first arm and the second arm in a position relative to the base tube. A second fastener extends through the second hole to engage at least one of the first arm and the second arm within the base tube to secure at least one of the first arm and the second arm in a position relative to the base tube.

The outer wall of the base tube defines a top wall and a bottom wall and the inner wall extends from the bottom wall in the direction of the top wall. The first fastener engages at least one of the first arm and the second arm to place a compressive force on at least one of the first arm and the second arm against the bottom wall. The walls of the respective first and second arms define the outer perimeter of the first and second arms, including at least a top face, a bottom face, and side faces of the first and second walls. The first and second fasteners place the compressive force on the first and second arms in alignment with a side face of the first and second fasteners. The inner wall may stop short of connecting with the top wall. The inner wall may connect to the top wall except in a first region about the first hole and in a second region about the second hole wherein the first and second fasteners extend through the first and second holes into the first region and the second region. Engagement between the first and second fasteners with the inner wall in the first and second regions defines an extent to which the first and second fasteners can be inserted into the base tube. The first and second arms may each include a notch that extends longitudinally along a length of the arms between adjacent sides of the wall of the arm. The notches may define a surface proximal to the top wall of the base tube from the inner wall at the first and second regions.

In examples of the wheel chock system, the first and second arms may each include a plurality of notches that extend longitudinally along a length of the respective first and second arms between adjacent sides of the walls of the first and second arms. The first and second arms each may include four notches and the first and second arms are cruciform in cross-section. At least one tab may extend from the base wall into the open interior. The at least one tab may form a keyed relationship with a notch of the plurality of notches. The first and second arms may each include four notches. The first and second arms are cruciform in cross-section and further include a plurality of tabs and four tabs of the plurality of tabs extend into each of the first cavity and the second cavity. The first fastener may engage the first arm and the second arm within the base tube and the second fastener engages the first arm and the second arm within the base tube to secure the first and second arms within the base tube in a retracted configuration. The first fastener may engage the first arm to secure the first arm in an extended position relative to the body tube. The second fastener may engage the second arm to secure the second arm in an extended position relative to the body tube. The first and second fasteners may be threaded fasteners and the base tube may further include a first threaded nut positioned relative to the first hole and a second threaded nut positioned relative to the second hole.

The wheel chock system may include a second wheel chock configured to support a wheel of a vehicle. The second wheel chock includes a base tube having an outer wall defining a tube perimeter and an open interior. An inner wall extends lengthwise through the base tube and divides the open interior into a first cavity and second cavity. The second wheel chock system may further include third and fourth holes through the outer wall of the base tube in alignment with the inner wall. A third fastener extends through the third hole. A fourth fastener extends through the fourth hole. A third may be received and movable within one of the first and second cavities of the base tube of the second wheel chock and secured within one of the first and second cavities by at least one of the third fastener or the fourth fastener.

In examples of the wheel chock system, the second arm may extend into the first or second cavity of the second wheel chock and the second fastener secures the second arm to the first wheel chock and the third fastener secures the second arm to the second wheel chock. A fourth arm may be received and movable within one of the first and second cavities of the base tube of the second wheel chock and secured within one of the first and second cavities by at least one of the third fastener or the fourth fastener. The fourth arm may extend into the first or second cavity of the first wheel chock and the second fastener further secures the fourth arm to the first wheel chock and the third fastener secures the fourth arm to the second wheel chock.

Various other features, objects, and advantages will be made apparent from the following description taken together with the drawings.

BRIEF DESCRIPTION OF THE DRAWINGS

The present disclosure is described with reference to the following figures. The same numbers are used throughout the figures to reference like features and like components.

DETAILED DISCLOSURE

As provided herein, exemplary embodiments of wheel chock apparatuses and systems for securing a wheel of a vehicle to a truck bed or a trailer. The apparatuses and systems disclosed herein can be exemplarily for securing a wheel of a vehicle, such as a motorcycle, dirt bike, scooter, golf car, all-terrain vehicle (ATV), and the like, to a truck bed, a trailer, or another towing vehicle.

Figure 1:
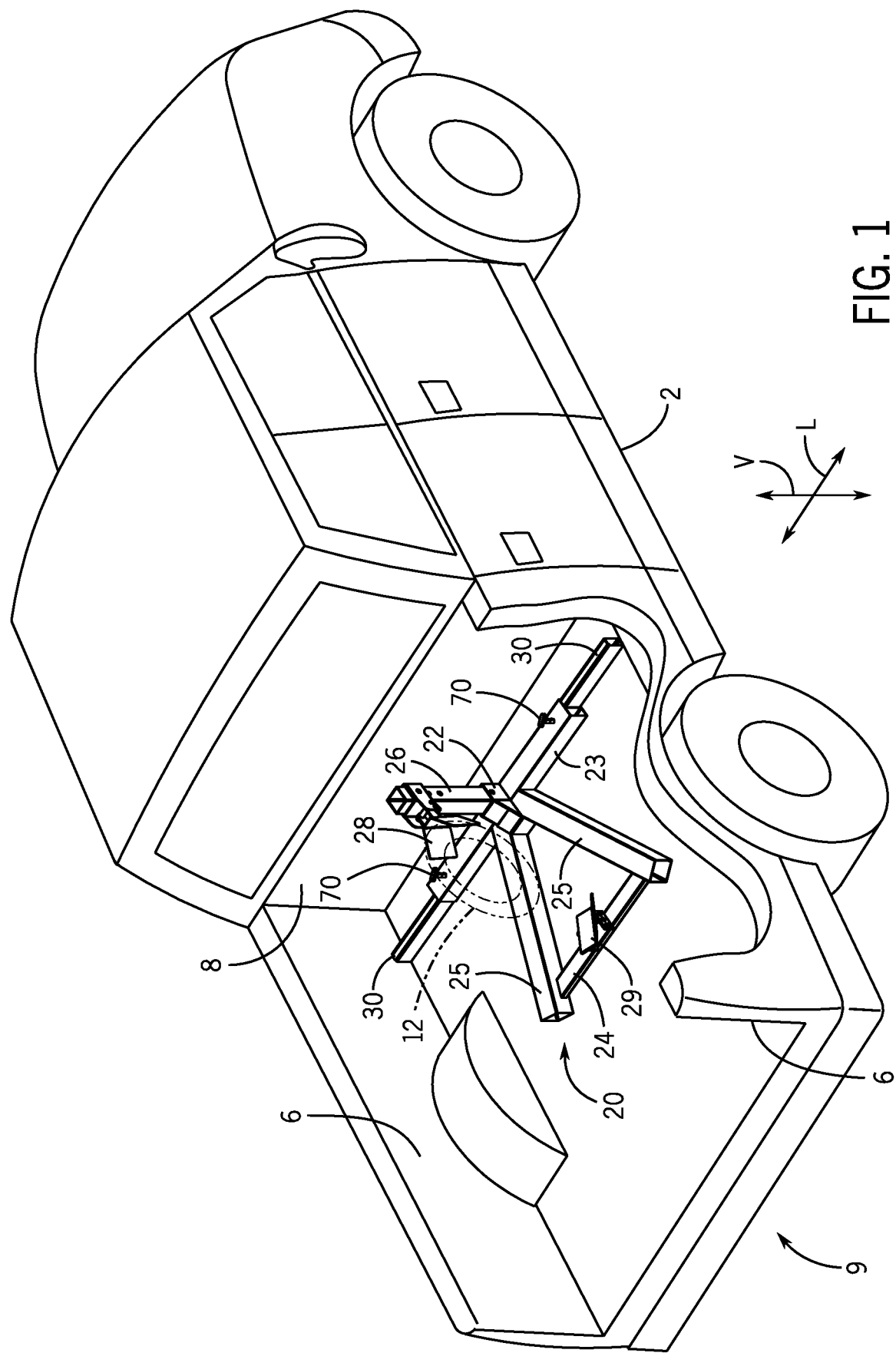
FIG. 1 is a perspective view of an exemplary embodiment of a wheel chock system on a truck bed.

FIG. 1 depicts an exemplary embodiment of a wheel chock system 20 according to the present disclosure exemplarily secured on a truck bed 4 of a truck 2. The wheel chock system 20 is positioned on the truck bed 4 between sidewalls 6 and next to a front wall 8 of the truck that is opposite a rear 9 of the truck 2. Note that one of the sidewalls 6 is depicted in dashed lines such that the entire wheel chock system 20 is depicted in FIG. 1. As will be described in greater detail hereinbelow, the wheel chock system 20 includes a wheel chock 22 configured to releasably secure to the wheel of a vehicle for transport and at least one arm 30 (FIG. 1 depicts two arms 30) that is extendable from the wheel chock 22 to contact the sidewalls 6 to secure the wheel chock 22 within the truck bed 4. Once the arms 30 contact the sidewalls 6, fasteners 70 (described further hereinbelow) secure the arms 30 relative to the wheel chock 22 such that the wheel chock 22 is securely braced between the sidewalls 6. Accordingly, the wheel chock 22 does not move or slide in the truck bed 4.

The wheel chock 22 is capable of receiving a wheel 12 (shown in dashed lines) of a vehicle (not shown) in a manner that fixes the position of the vehicle. In particular, the wheel chock 22 resists the vehicle from sliding and/or tipping over on the truck bed 4. While the wheel chock 22 resists these movements, in practice, it is still advisable to securely tie the vehicle to the truck bed 4 for transport of the vehicle by the truck 2. In the exemplary embodiment depicted in FIG. 1, the wheel chock system 20 includes an upper cradle 28 and a lower cradle 29 connected to the wheel chock 22 and configured to receive and support the wheel 12 of the vehicle. The upper cradle 28 and the lower cradle 29 have projections that partially extend past or alongside a tire of the wheel 12. The lower cradle 29 is pivotably secured to a crossbar 24 of the wheel chock. The lower cradle pivots about a pivot point, which may be incrementally adjustable along the crossbar 24. The lower cradle 29 pivots between a loading position where the lower cradle 29 provided a ramp to receive the wheel of the vehicle and a locking position wherein the lower cradle 29 holds the wheel against the upper cradle 28. Once the weight of the vehicle wheel crosses over the pivot point of the lower cradle 29, the lower cradle pivots between the loading position and the locking position. The upper cradle 28 is adjustably connected to a support post 26 of the wheel chock 22. The user can use the adjustable connection to accommodate the size and shape of the wheel to be received by the wheel chock 22.

FIGS. 2-8 depict portions of the exemplary embodiment of the wheel chock system 20 of FIG. 1 in greater detail. The wheel chock 22 has a base tube 23. The base tube 23 extends in a horizontal direction. The support post 26 extends vertically from the base tube 23. A pair of legs 25 extend from the base tube 23 at angles outward away from one another, although it will be recognized that the legs 25 may be oriented at other angles relative to the base tube 23, including perpendicular to the base tube 23. The crossbar 24 extends between the two legs 25 between ends of the legs 25 opposite the base tube 23. As previously mentioned, the lower cradle 29 is pivotably secured to the crossbar 24. The base tube 23 and the legs 25 are configured to rest against the truck bed 4. The crossbar 24 extends between the legs 25 and may be at a position intermediate the height of the legs 25 such that the crossbar 24 is held at a position above the truck bed 4. The crossbar 24 is thus vertically elevated above the lower surface of the legs 25, and therefore, the crossbar 24 does not contact the truck bed 4. The size and/or shape of the base tube 23, the crossbar 24, the legs 25, and the support post 26 can vary, and in the examples depicted in FIGS. 2-8 the base tube 23, the crossbar 24, the legs 25, and the support post 26 are hollow extruded members with generally rectangular cross-sections.

Figure 2:
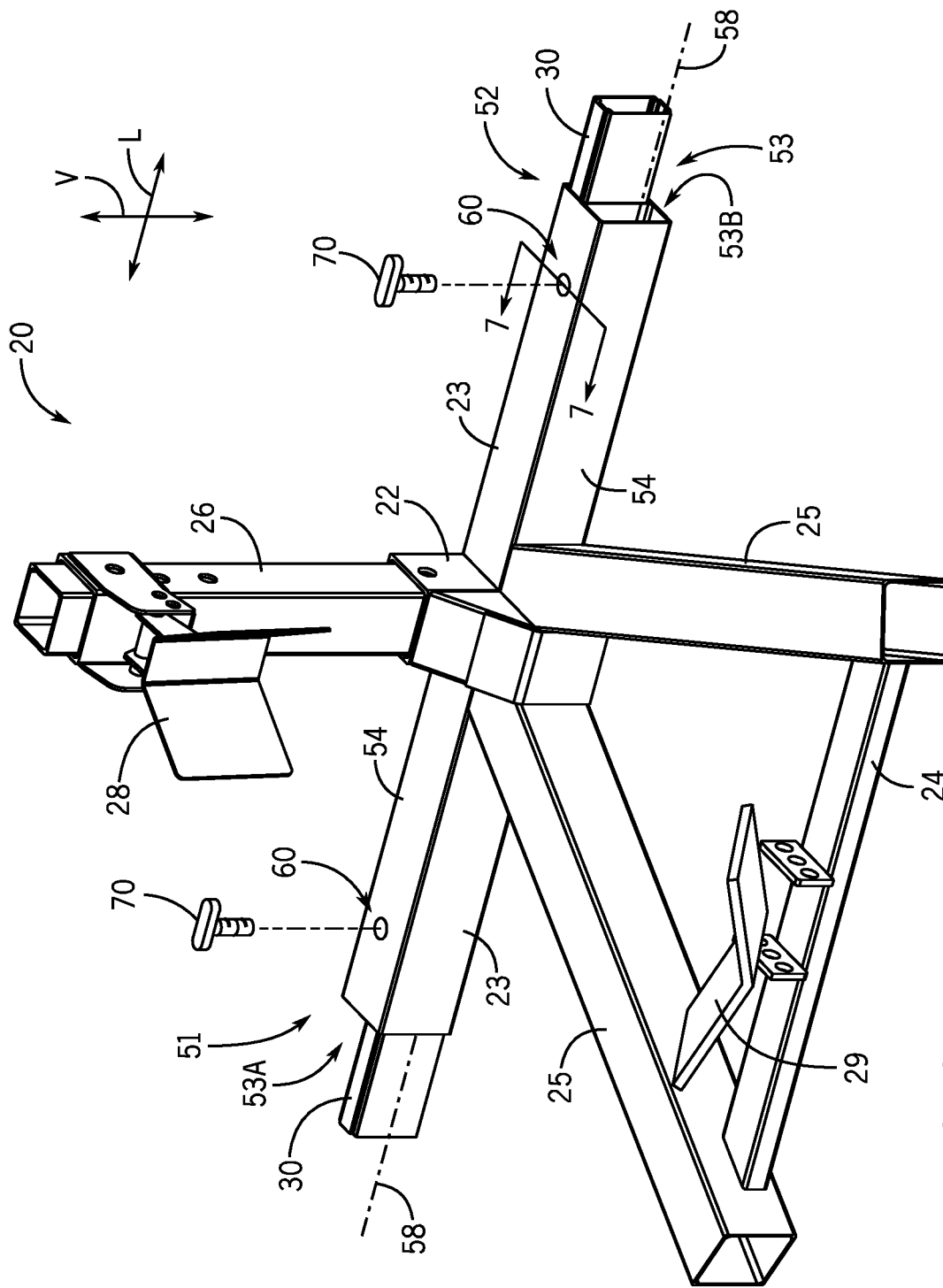
FIG. 2 is a perspective view of the wheel chock system.
Figure 3:
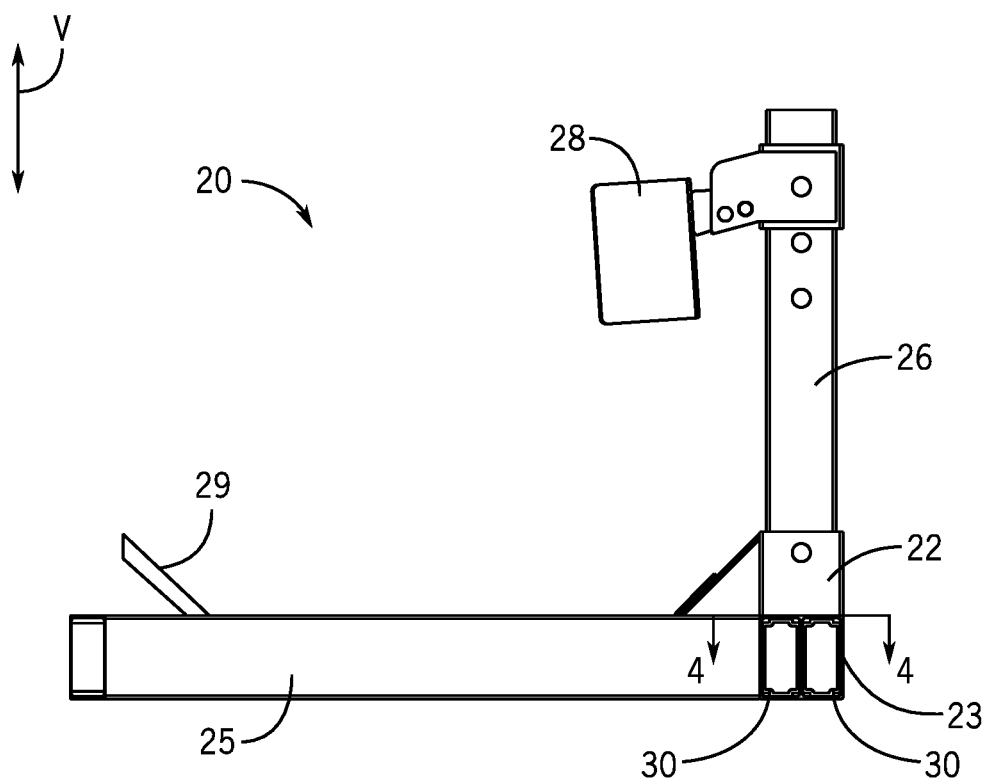
FIG. 3 is a side view of the wheel chock system.
Figure 4:
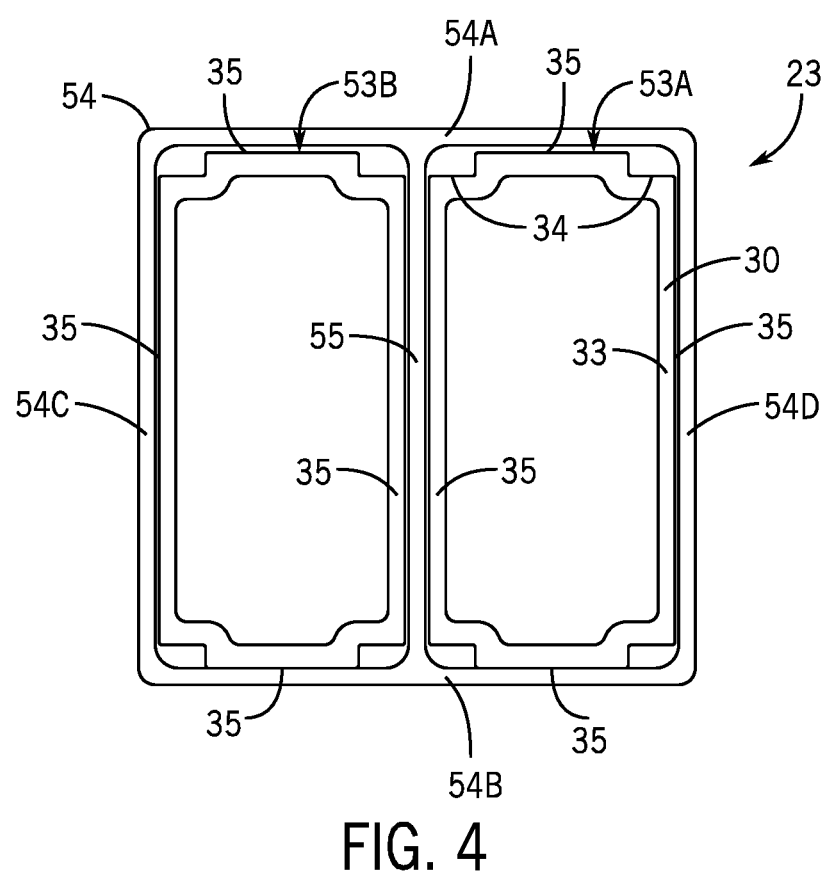
FIG. 4 is a top-sectional view of a base tube and arms as taken along line 4-4 of FIG. 3.
Figure 5:
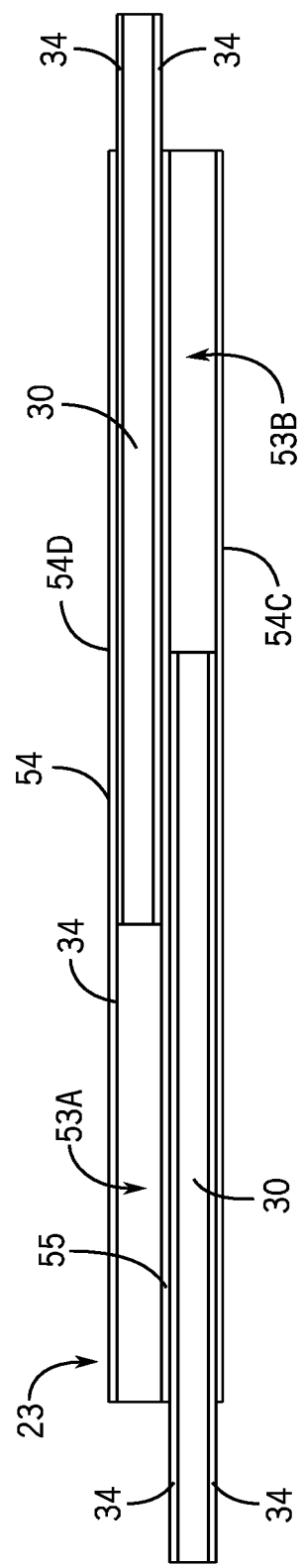
FIG. 5 is a side view of the base tube and arm.

Referring to FIGS. 2, 4, and 5, the base tube 23 extends between a first end 51 and an opposite second end 52. The base tube 23 has an outer wall 54 that defines a perimeter of an open interior 53. The one or more arms 30 are inserted and slidably received (described further hereinbelow) within the open interior 53. The outer wall 54 includes a top wall 54A, an opposite bottom wall 54B, a pair of opposing sidewalls 54C, 54D. An inner wall 55 is located interior of the outer wall 54 and spaced apart from the sidewalls 54C, 54D. The inner wall 55 extends between the top and bottom walls 54A, 54B and is parallel to the sidewalls 54C, 54D. The inner wall bisects the open interior 53 into a first cavity 53A and a second cavity 53B in which at least one arm 30 can be slidably received (described further herein). It will be understood that the first and second cavities 53A, 53B may have different cross-sectional areas, however, there are additional advantages as disclosed herein to be gained if such cavities are the same. In the exemplary embodiment, the inner wall 55 extends along the longitudinal axis 58 between the ends 51, 52 of the base tube 23 to thereby divide the open interior 53 into the cavities 53A, 53B. In other examples, the inner wall 55 extends a short distance into the open interior 53 from the ends 51, 52 and does not extend the entire longitudinal length of the base tube 23. In a still further example, the inner wall 55 extends from one of the top wall 54A or bottom wall 54B in the direction of the other of the top wall 54A or bottom wall 54B, while stopping short thereof. In each of these examples, the inner wall 55 provides for a division of the base tube 23 into the first cavity 53A and the second cavity 53B, each one configured to slidably receive an arm 30 therein.

The arms 30 are respectively received into the first cavity 53A and the second cavity 53B of the base tube 23. The arms 30 are dimensioned such that outer perimeters of the arms fit within the inner perimeters of the first cavity 53A and the second cavity 53B, and the arms 30 can therefore slidingly translate within the respective cavities 53A, 53B. The arms 30 are elongated along a longitudinal axis 38 between a first end 31 and a second end 32. By sliding translation, the arms 30 can retract within the base tube 23 for storage, transportation, or temporary use, and may extend outwards from the base tube 23 in opposite directions to engage the side walls of a truck bed or trailer. While the arms 30 may be rectangular, in the examples depicted further herein, the arms may be cruciform, with notches 34 defined at each corner of the arm 30. The arms 30 have a wall 33 that defines the outer perimeter of the arm with notches 34 between respective faces 35 of the wall 33.

Figure 6:
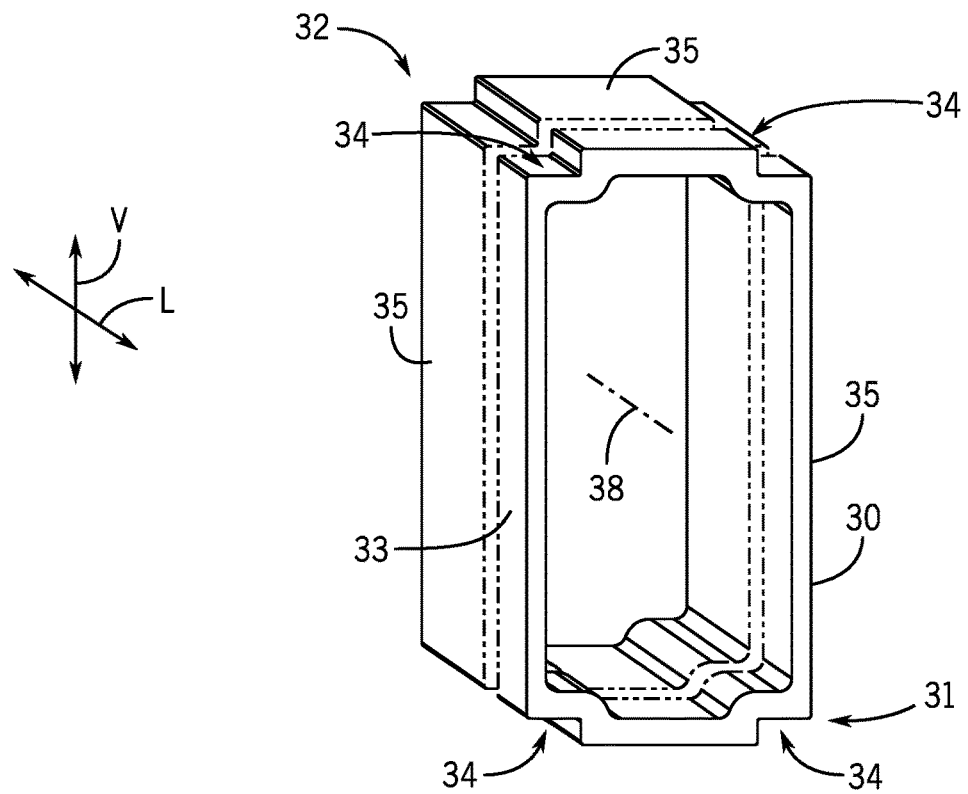
FIG. 6 is a perspective view of an exemplary embodiment of an arm.

The length of the arm 30 can vary, for example as indicated by the dashed break lines of FIG. 6. In one example, the length of the arm or arms 30 equal the length of the base tube 23. In another example, the arms 30 are each longer than the base tube 23. In such an example, the length of the arms 30 define a minimum width of the wheel chock system 20, while the arms double up their lengths by extending past one another within the respective cavities 53A, 53B.

Figure 7:
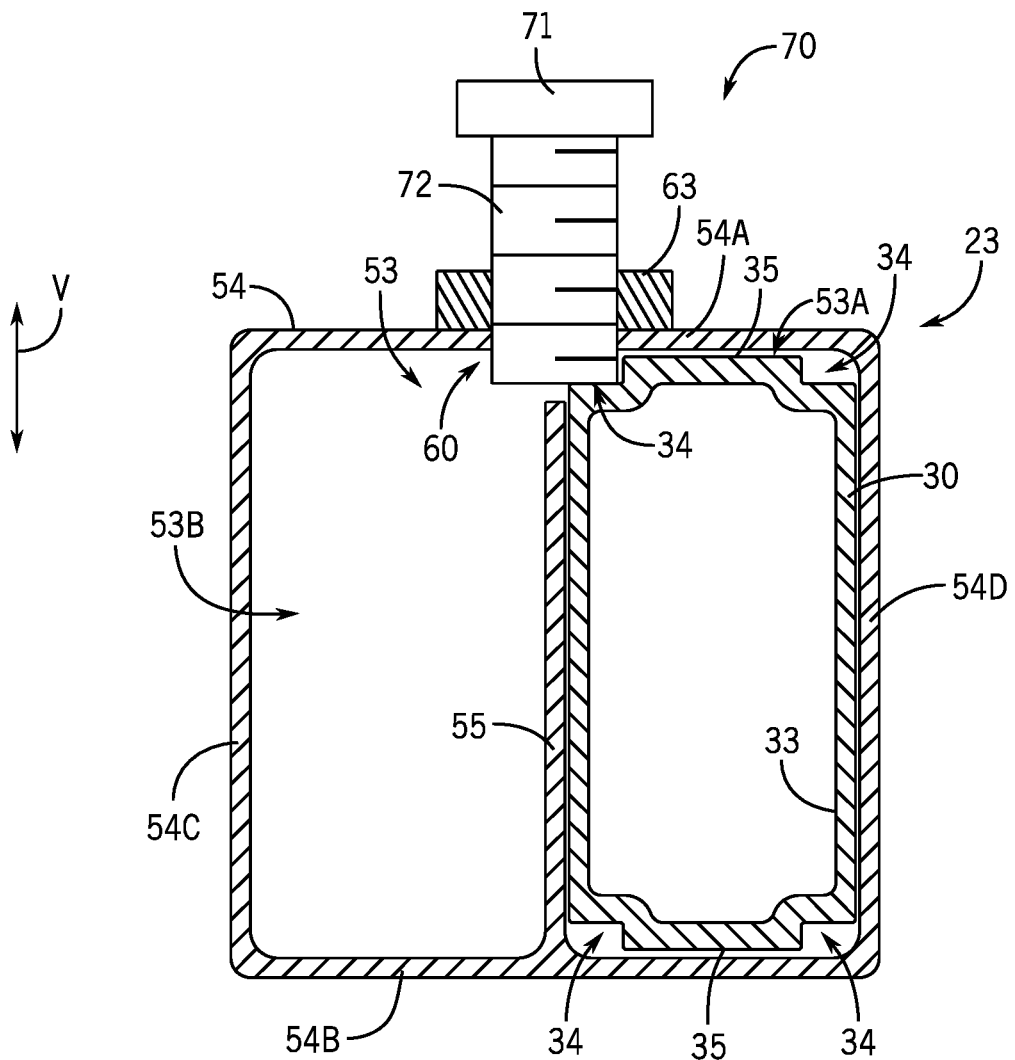
FIG. 7 is a side sectional view as taken along line 7-7 of FIG. 2.
Figure 8:
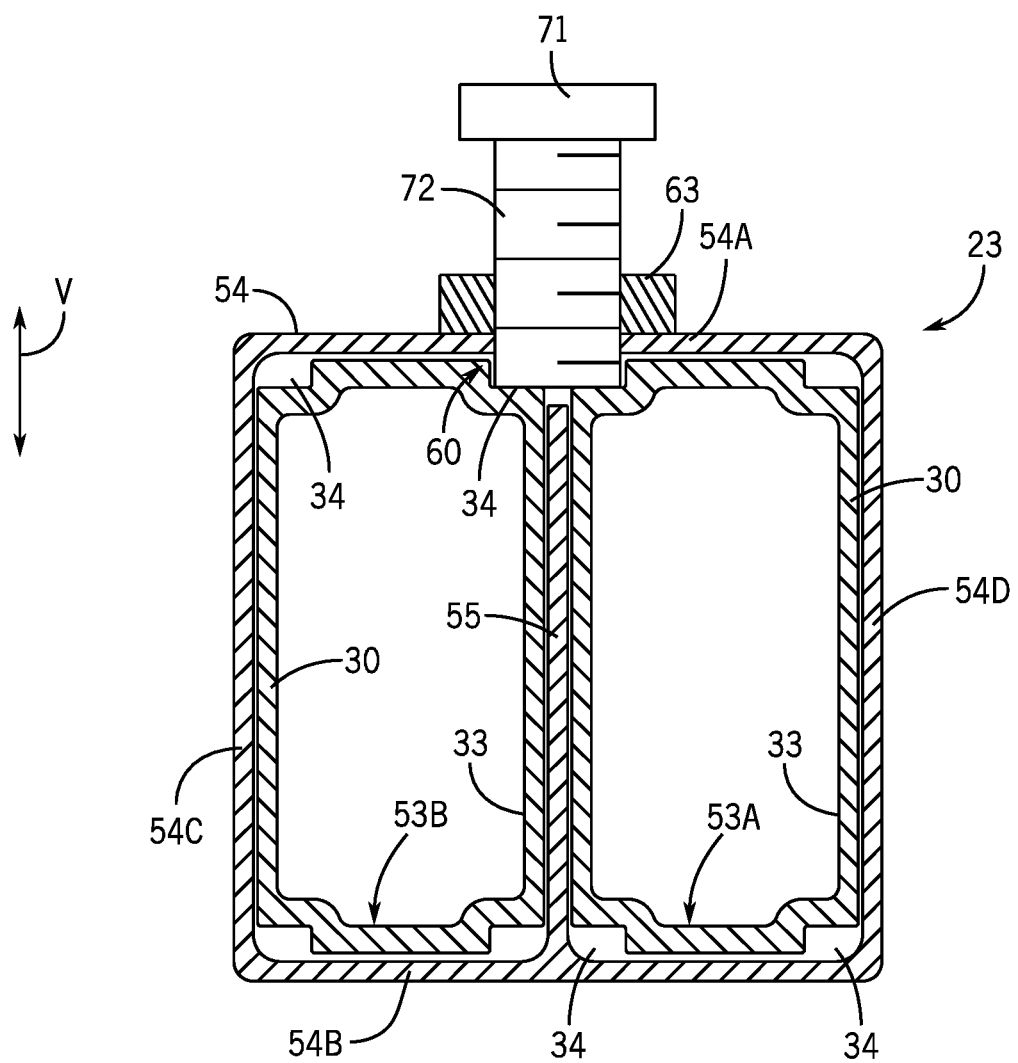
FIG. 8 is an exemplary side sectional view of a fastener engaging two arms through a base tube.

FIGS. 7 and 8 depict two exemplary interactions between the fasteners 70 and the arms 30 within the base tube 23. While the arms 30 are movable within the base tube 23, the fasteners 70 operate to secure the arms 30 at positions relative to the base tube 23. In this manner, the fasteners 70 can lock the arms 30 into extended positions engaging the sidewalls 6 of the truck bed 4. The fasteners 70 are depicted as threaded fasteners with threads 61 around a shaft 72. While so depicted, it will be recognized that other varieties of fasteners may be used from the present disclosure which are capable to provide the compressive force against the arm 30 as described herein. One such example may use a spring to apply a compressive force that biases the fastener 70 into engagement with the arm 30. A handle 71 can be pulled in a direction away from the base tube 23 to thereby compress the spring and move the shaft 72 away from the arm 30. When the handle 71 is released, the spring moves the shaft 72 back into contact with the arm 30.

The shaft 72 extends through a hole 60 in the outer wall 54 of the base tube 23. The threads 61 may engage the sides of the hole 60 or, as depicted in FIG. 8, an additional threaded nut 63 may be secured around the hole 60. The free end of the shaft 72 contacts the outer wall 33 of the arm 30. Further movement of the shaft 72 through the hole 60 places a compressive force against the arm 30. As such, the arm 30 is moved into contact with the outer wall 54 of the base tube 23 and the arm 30 is clamped between the shaft 72 and the outer wall 54. In the example depicted, the hole 60 defined in the top wall 54A. The shaft 72 engages the arm 30 and places a compressive force on the arm 30 against the bottom wall 54B.

While the arm 30 may be rectangular in shape, it has been discovered that the notch 34 provides an improved surface for engagement with the fastener 70. In an embodiment, a cruciform arm 30, with notches 34 in each corner may be inserted into either cavity 53A, 53B in any orientation and still orient a notch 34 in a position for contact with the fastener 70. The notch 34 can provide an improved surface for engagement with the fastener 70 as it may be common in rectangular extruded tube for the outer corners to be rounded, which would curve the material away from the fastener 70. The notch 34 also provides a space for the fastener 70 to remain engaged with the base tube 23 and partially extending into the open interior 53, while the arm 30 can slidingly translate freely therein. Further tightening of the fastener 70 causes engagement with the notch 34. Engagement of the arm 30 as depicted in FIGS. 7 and 8 places the compressive force in line with the sidewall 54C where the wall 33 of the arm is strongest and can resist deformation over repeated use. Furthermore, the force from the fastener 70 is off-center relative to the arm 30 and can place a rotative component to the force on the arm 30, which may further put the arm 30 into contact with the sidewall 54D to help secure the arm 30 as well.

As shown in FIGS. 7 and 8, the inner wall 55 does not extend to the top wall 54A at the area about the hole 60. This provides space for the fastener 70 to extend into the open interior 53 and into engagement with the arm 30 at the notch 34. This limit of the inner wall 55 may occur in a number of ways. For example, if the holes 60 are drilled into the base tube 23 in a machining step of the manufacture, then this drilling can remove the material of the inner wall 55 in the area about the fastener 70. In another example, the inner wall 55 may only extend partially towards the top wall 54A for the length of the arm 30. In a still further example, the inner wall 55 may be formed with gaps in the area local to the holes 60. In use, this has the effect of the fastener 70 engaging the notch 34, but not the inner wall 55. In still another example, the inner wall 55 can thus define a maximum extent in which the fastener 70 can be inserted into the base tube 23. In an example, this may be in general alignment with an expected height of the notch 34, or may be below the expected height of the notch 34.

FIG. 7 depicts the fastener 70 securing a single arm 30. This, for example, may occur to secure the arms 30 within the base tube 23 at the positions shown in FIG. 2, depicting the arms 30 in an extended position. However, in other times of use, the fastener 70 can engage against the walls 33 of both arms 30, as shown in FIG. 8. A storage configuration is a first example of when this may occur. Because each arm 30 translates within a separate cavity 53A, 53B the two arms 30 can slide past one another, and for example into alignment with one another, minimizing the width of the wheel chock system 20. Fasteners 70 at either end of the base tube 23 can engage both arms 30 to secure the arms 30 in this position.

Figure 9:
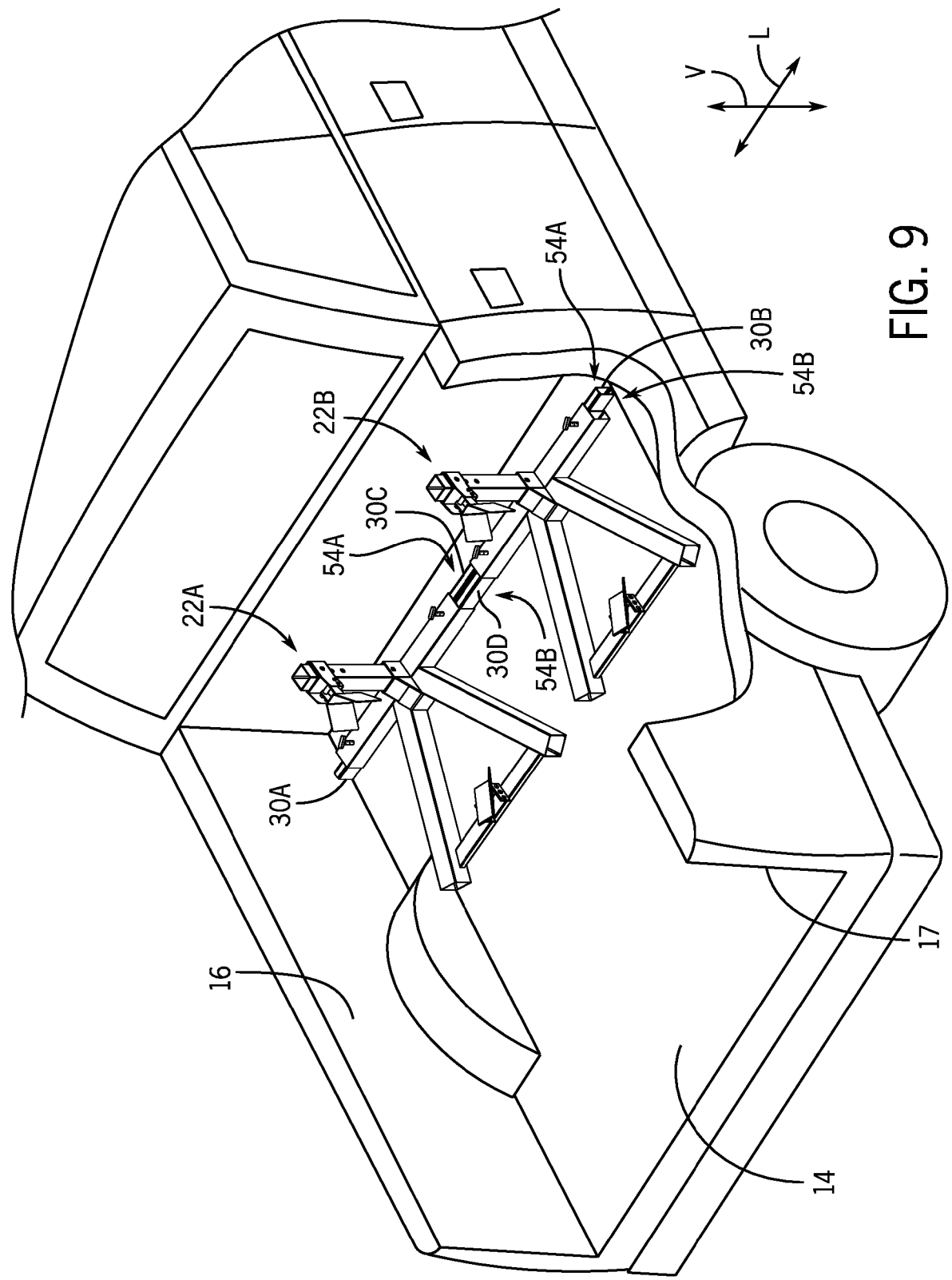
FIG. 9 is a perspective view of an example of the wheel chock system with two wheel chocks across a truck bed.

Another example of when the FIG. 8 may exemplarily occur will be described in relation to FIG. 9 which shows an additional example of the wheel chock system 20 on a trailer 14. The wheel chock system 20 has two wheel chocks 22A and 22B. As described above, the wheel chock system includes a plurality of arms, for example, arms 30A, 30B, arm 30C, and optionally arm 30D. The arm 30A extends from one of the cavities 53A, 53B of wheel chock 22A. Arm 30B extends from one of the cavities 53A, 53B of wheel chock 22B and contacts a second sidewall 17 of the trailer 14. Arm 30C forms the interconnection between wheel chock 22A and wheel chock 22B. The arm 30C is partially received into a cavity 53A, 53B of the wheel chock 22A and a cavity 53A, 53B of the wheel chock 22B. Fasteners 70 of both wheel chock 22A and 22B secure to the arm 30C. As such, both wheel chocks 22A, 22B are secured on the trailer 14 between the sidewalls 16, 17 and to each other. However, it will be recognized that in use, a user is likely to have two arms 30 associated with each wheel chock 22, and therefore may use arm 30D to further interconnect the wheel chock 22A and the wheel chock 22B. In an example, arm 30C extends between respective cavities 53A of the wheel chocks 22A, 22B while the arm 30D extends between respective cavities 53B of the wheel chocks 22A, 22B. Fasteners 70 of each of the wheel chocks 22A, 22B may simultaneously engage both arms 30C, 30D to secure both arms to the wheel chocks 22A, 22B. This engagement may appear as depicted in FIG. 8. Each wheel chock 22A, 22B is configured to receive a wheel 12 of two different vehicles (not shown), such as two motorcycles, to thereby secure the two vehicles on the trailer 14. Alternatively, each wheel chock 22A, 22B can receive two wheels of the same vehicle, such as a golf cart, to thereby secure the vehicle on the trailer 14.

The occurrence of the example of FIG. 8 may further be associated with improved resistance to twisting or torque forces on the wheel chock 22, and particularly the arms 30 of the wheel chock 22. In uses wherein the arms 30 need not extend much out of the base tube 23, each arm 30 may be secured by both fasteners 70. A similar example may occur when two or more wheel chocks 22 are used within a truck bed as depicted in FIG. 9. In such an example, as noted above, as single arm 30 may extend between the base tubes 23 of adjacent wheel chocks 22 and the outside arms 30 of the respective wheel chocks 22 may not need to extend far to reach the side walls of the truck bed. Therefore, the interior positioned fasteners 70 of the adjacent wheel chocks 22 may engage both the common, central arm 30 (e.g. 30C or 30D of FIG. 9) and one of the outer arms 30 (e.g. 30A, 30B).

Figure 10:
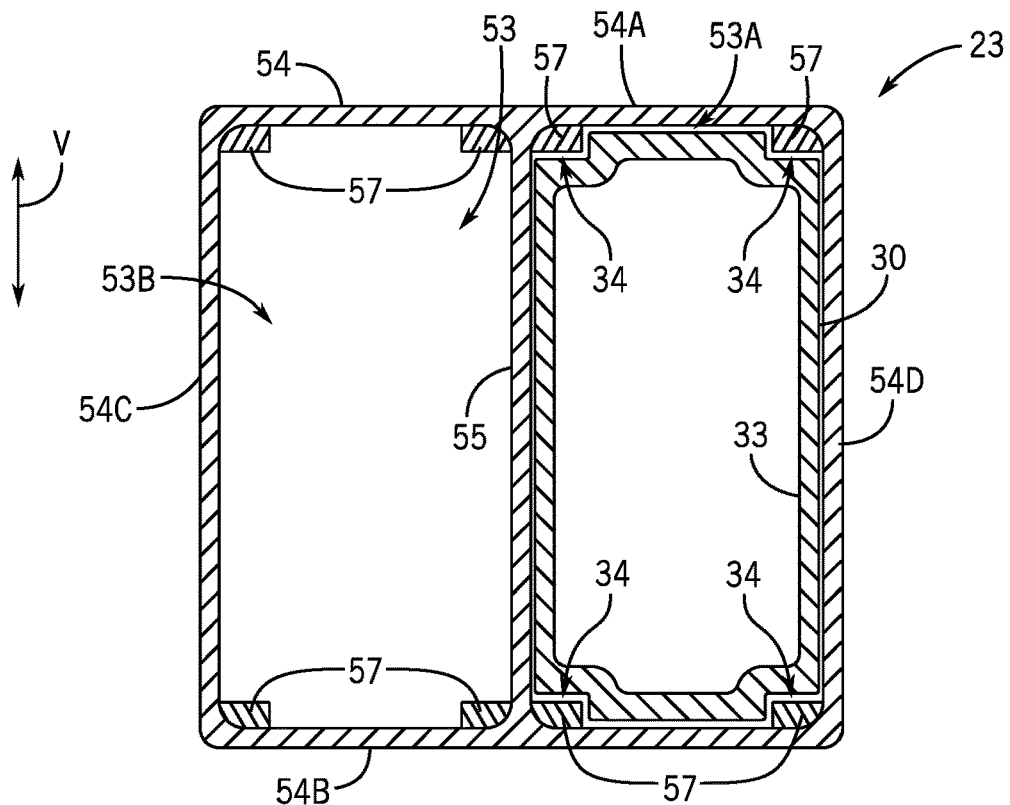
FIG. 10 is an example of a base tube and an arm.

FIG. 10 depicts another example of a base tube 23 as may be used in an embodiment of a wheel chock system. The base tube 23 includes one or more tabs 57 extend from the outer wall 54 into the open interior 53 and/or the cavities 53A, 53B. In addition to the further advantages as described herein, engagement of the tabs 57 with the arms 30 as further described can also have the effect of resisting twisting or torque of the arms 30 within the base tube 23 during use. The tabs 57 are at the ends 51, 52 of the front base tube 23 to thereby define a cross-section of the cavity 53A, 53B. As such, only arms 30 with cross-sections that correspond to the cross-section of the cavity 53A, 53B can be inserted and received into the cavities 53A, 53B. In the exemplary embodiment, the tabs 57 are rectangular-shaped members coupled (e.g., welded) to the interior surface of the outer wall 54. The tabs 57 extend a short distance (e.g., 1.0 inch, 6.0 inches) in the longitudinal direction L in the cavities 53A, 53B. In other exemplary embodiments, the tabs 57 continuously extend in the cavities 53A, 53B between the ends 51, 52 of the base tube 23. In still other exemplary embodiments, the tabs 57 are integral with the front base tube 23 and formed with the base tube 23 during an extrusion process such that the front crossbar 23 has a continuous shape and each cavity 53A, 53B has a continuous cross-shaped cross-section. In other exemplary embodiments, the cross-section of the cavities 53A, 53B changes a distance away from the ends 51, 52 of the base tube 23.

Figure 11:
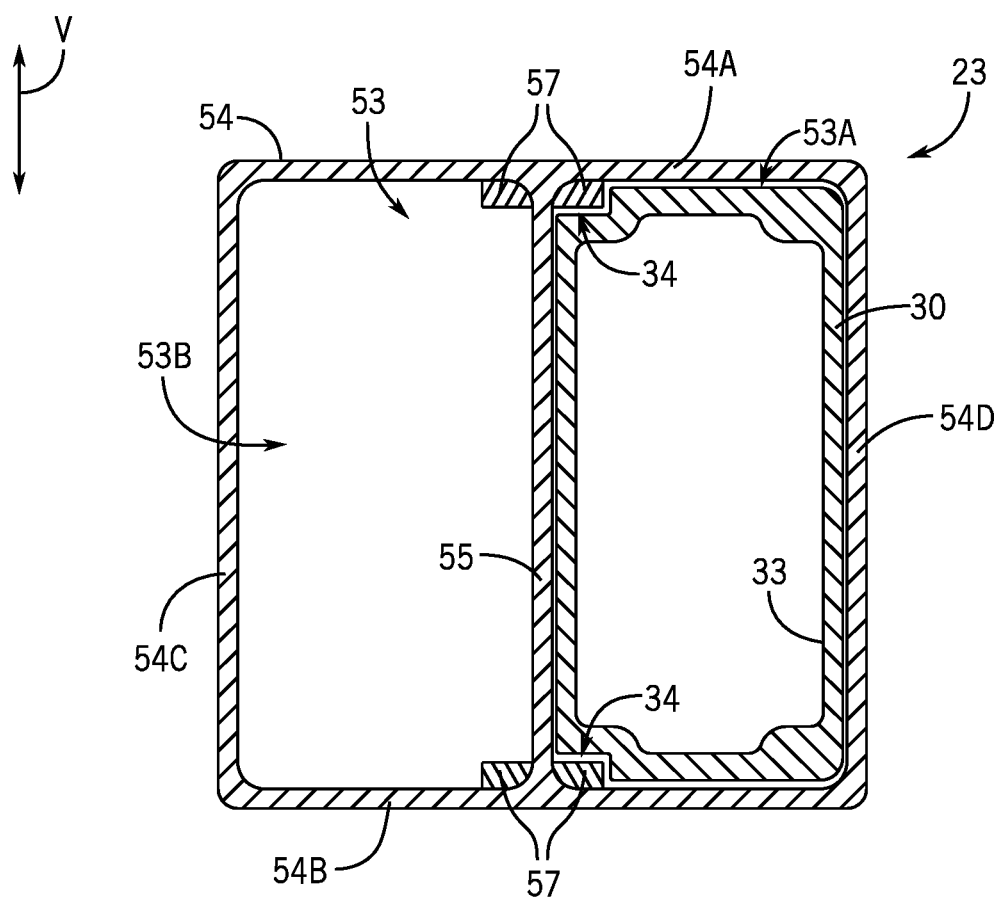
FIG. 11 is another example of a base tube and an arm.

FIG. 11 depicts another example of a base tube 23 and arm 30 as may be used with a wheel chock system 20. The base tube 23 exemplarily includes two tabs 57 in each of the cavities 53A, 53B. The arm 30 may correspondingly only have notches 34 on one side with the opposite side rectangular in shape. In such an embodiment, the notches 34 of the arm 30 and the tabs 57 of the base tube 23 must align in order for the arm 30 to be slidingly received within one of the cavities 53A, 53B of the base tube 23. In one exemplary embodiment, this may be used to distinguish between compatible and incompatible arms when the sizes and specifications (e.g. strength and/or construction) of arms differ between different product offerings of similar design.

Examples of the wheel chock as described herein can provide additional advantages. Apart from use in a truck bed, the wheel chocks may be used on the floor of a vehicle showroom or garage. In such instances, the arms can provide a variety of lengths in order to efficiently use floor space and provide an adjustable amount of stability. The extendable arms also provide flexibility of locations where the wheel chock can be secured, for example with uneven lengths of the arms extending from the wheel chock. The wheel chock enables the convenient use of longer arms because the arms can be stored and/or accommodated in parallel through the tube, doubling or more the length of each arm that can be stored within the tube for a given tube length.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives, and modifications are possible within the scope of the appended claims.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wheel chock system comprising:
   a wheel chock configured to support a wheel of a vehicle, the wheel chock comprising:
      a base tube having an outer wall defining a tube perimeter and an open interior; and
      an inner wall extending lengthwise through the base tube and dividing the open interior into a first cavity and second cavity; and first and second arms received within respective ones of the first and second cavities, wherein the first and second arms are slidingly movable in parallel past one another within the respective first and second cavities.

2. The wheel chock system of claim 1, further comprising:
first and second holes through the outer wall of the base tube in alignment with the inner wall;
a first fastener that extends through the first hole to engage at least one of the first arm and the second arm within the base tube to secure at least one of the first arm and the second arm in a position relative to the base tube; and
a second fastener that extends through the second hole to engage at least one of the first arm and the second arm within the base tube to secure at least one of the first arm and the second arm in a position relative to the base tube.

3. The wheel chock system of claim 2, wherein the outer wall of the base tube defines top wall and a bottom wall and the inner wall extends from the bottom wall in the direction of the top wall.

4. The wheel chock system of claim 3, wherein the first fastener engages at least one of the first arm and the second arm to place a compressive force on at least one of the first arm and the second arm against the bottom wall.

5. The wheel chock system of claim 4 wherein walls of the respective first and second arms define the outer perimeter of the first and second arms, including at least a top face, a bottom face, and side faces of a first and second one of the walls of the arms, and the first and second fasteners place the compressive force on the first and second arms in alignment with a side face of the first and second fasteners.

6. The wheel chock system of claim 3, wherein the inner wall stops short of connecting with the top wall.

7. The wheel chock system of claim 3, wherein the inner wall connects to the top wall except in a first region about the first hole and in a second region about the second hole wherein the first and second fasteners extend through the first and second holes into the first region and the second region.

8. The wheel chock system of claim 7, wherein engagement between the first and second fasteners with the inner wall in the first and second regions defines an extent to which the first and second fasteners can be inserted into the base tube.

9. The wheel chock system of claim 8, wherein the first and second arms each comprise a notch that extends longitudinally along a length of the arms between adjacent sides of a wall of a respective one of the arms, wherein the notch defines a surface proximal to the top wall of the base tube from the inner wall at the first and second regions.

10. The wheel chock system of claim 2, wherein the first and second arms each comprise a plurality of notches that extend longitudinally along a length of the respective first and second arms between adjacent sides of walls of the first and second arms.

11. The wheel chock system of claim 10, wherein the first and second arms each comprise four notches and the first and second arms are cruciform in cross-section.

12. The wheel chock system of claim 10, further comprising at least one tab that extends from the outer wall into the open interior, wherein the at least one tab forms a keyed relationship with a notch of the plurality of notches.

13. The wheel chock system of claim 12, wherein the first and second arms each comprise four notches and the first and second arms are cruciform in cross-section, and further comprising a plurality of tabs, including the at least one tab, wherein four tabs of the plurality of tabs extend into each of the first cavity and the second cavity.

14. The wheel chock system of claim 2, wherein the first fastener engages the first arm and the second arm within the base tube and the second fastener engages the first arm and the second arm within the base tube to secure the first and second arms within the base tube in a retracted configuration.

15. The wheel chock system of claim 14, wherein the first fastener is engageable with the first arm to secure the first arm in an extended position relative to the base tube and the second fastener is engageable with the second arm to secure the second arm in an extended position relative to the base tube.

16. The wheel chock system of claim 2 wherein the first and second fasteners are threaded fasteners and the base tube further comprises a first threaded nut positioned relative to the first hole and a second threaded nut positioned relative to the second hole.

17. The wheel chock system of claim 2, wherein the wheel chock is a first wheel chock, and further comprising:
a second wheel chock configured to support a wheel of a vehicle, the second wheel chock comprising:
a base tube having an outer wall defining a tube perimeter and an open interior;
an inner wall extending lengthwise through the second chock base tube and dividing the second chock open interior into a first cavity and second cavity;
first and second holes through the second chock outer wall of the second chock base tube in alignment with the second chock inner wall;
a third fastener that extends through the first hole of the second wheel chock; and
a fourth fastener that extends through the second hole of the second wheel chock; and
a third arm received and movable within one of the first and second cavities of the base tube of the second wheel chock and secured within one of the first and second cavities by at least one of the third fastener or the fourth fastener.

18. The wheel chock system of claim 17, wherein the second arm extends into the first or second cavity of the second wheel chock and the second fastener secures the second arm to the first wheel chock and the third fastener secures the second arm to the second wheel chock.

19. The wheel chock system of claim 18, further comprising a fourth arm received and movable within one of the first and second cavities of the base tube of the second wheel chock and secured within one of the first and second cavities of the second chock by at least one of the third fastener or the fourth fastener.

20. The wheel chock system of claim 19, wherein the fourth arm extends into the first or second cavity of the first wheel chock and the second fastener further secures the fourth arm to the first wheel chock and the third fastener secures the fourth arm to the second wheel chock.

* * * * *